July 16, 1968 D. J. SAVAGE 3,393,327

RING TRANSIENT ANALOG DELAY LINE

Filed Nov. 2, 1964

INVENTOR.
DONALD J. SAVAGE

BY Henry Hansen
William C. Everett
ATTORNEYS

United States Patent Office 3,393,327
Patented July 16, 1968

3,393,327

RING TRANSIENT ANALOG DELAY LINE

Donald J. Savage, Ardsley, Pa., assignor to the United States of America as represented by the Secretary of the Navy Filed Nov. 2, 1964, Ser. No. 408,445
3 Claims. (Cl. 307—293)

ABSTRACT OF THE DISCLOSURE

A pulse delaying circuit including an inverting amplifier, a heavily damped ring circuit actuated by the inverting amplifier to provide an oscillatory series of recovery transients, a non-inverting amplifier, and a diode circuit for allowing only the first recovery transient to appear at an output terminal.

The invention described herein may be manufactured and used by or for the Government of the United States of America for governmental purposes without the payment of any royalties thereon or therefor.

The present invention relates to a delay line for electrical pulses and more particularly for a delay line for low frequency electrical pulses used in a sonar system.

In the field of delay lines in general, and in the field of low frequency delay lines used for sonar in particular, it has been the general practice to employ delay lines composed of series of LC circuits, each of which delays the phase of the incoming pulse by a small increment, and the total of which produces the total delay. Each LC circuit in the series comprises an inductance and capacitance, and each combination of inductance and capacitance is capable of varying the phase of incoming pulses by a period of a few microseconds at most. To produce a delay as long as a millisecond or greater as is needed in sonar circuits, a large series of LC circuits each comprising an inductance and capacitance individually must be strung together producing a bulky and expensive equipment. Other means for producing a delay pulse have been a one-shot multivibrator. However, a one-shot multivibrator is difficult to control as to delay and pulse width and neither the shape of the pulse nor its amplitude are similar to the input pulse.

The general purpose of this invention is to produce a delay line which provides an output pulse which is similar in shape and height to the input pulse and delayed from it by a relatively long delay, in order of a millisecond, and which is small in size, low in cost, and insensitive to vibration. To accomplish this, the present invention contemplates a ring circuit, tuned to the frequency of the input pulse, which is heavily damped and into which is fed the input pulse inverted. The output of this ring circuit is an inverted original pulse plus a number of recovery transients, the first of which is of the same polarity as the original input pulse. This pulse is amplified and passed through a clamp circuit which removes the original pulse and all unwanted excursions comprising subsequent transients, leaving only an amplified first recovery transient which is similar in height and shape to the input pulse but delayed from it by a time determined by the tuned frequency of the ring circuit.

Accordingly, it is an object of the present invention to provide a delay line providing a relatively long delay at low cost.

Another object of the invention is to provide a delay line which employs the first recovery transient rather than the original pulse.

A further object of the invention is the provision of a delay line utilizing only a single LC ring circuit to replace the usual series of inductances and capacitances of a common delay line.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
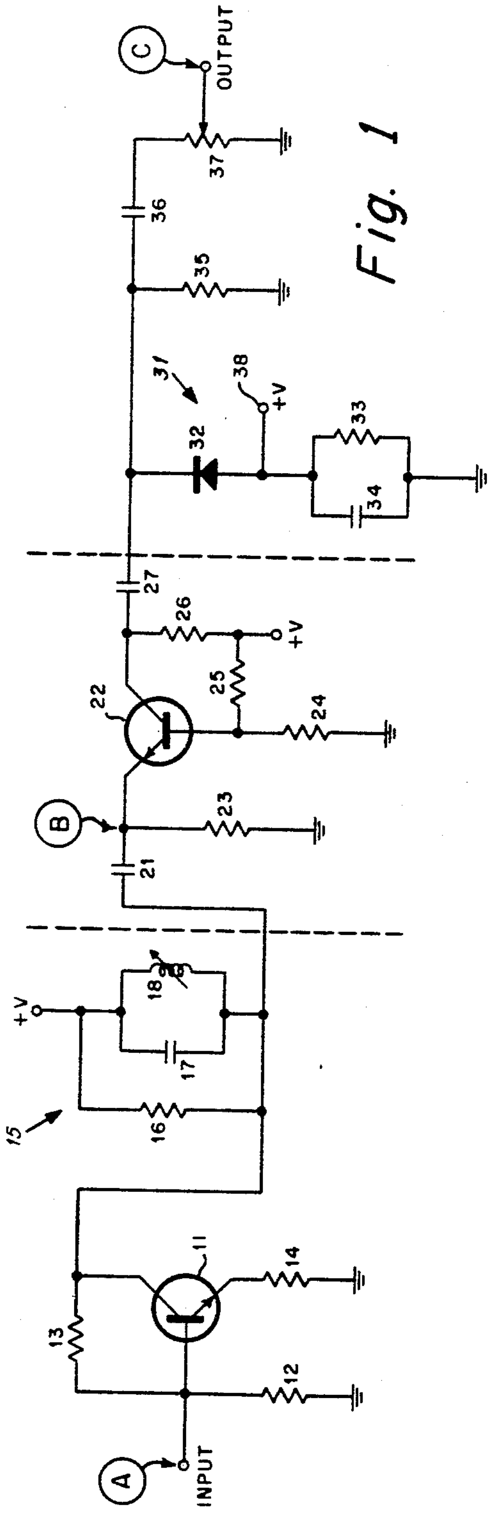
FIG. 1 shows a circuit of a delay line according to the invention.
Figure 2:
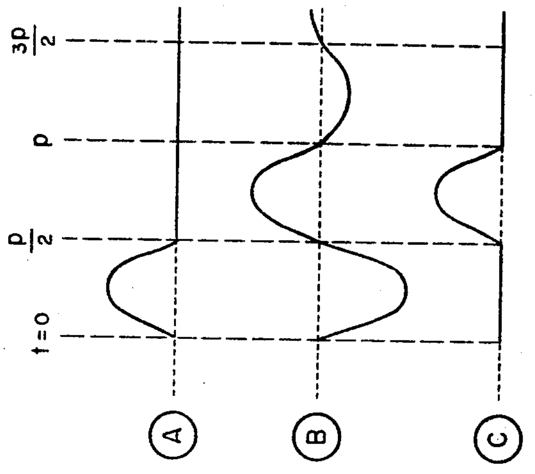
FIG. 2 shows a series of waveforms at various points in the circuit of FIG. 1.

The pulse input to the circuit is provided at point A in FIG. 1. Waveform A in FIG. 2 shows the shape of the input pulse. It is presumed the input pulse has a width approximately equal to one-half of a period which is the reciprocal of the resonant frequency of the delay line. The pulse is introduced at the base of an inverting amplifier 11 which is accompanied by appropriate biasing resistances 12, 13 and 14. If the input pulse is positive going the output of the inverting amplifier 11 will be negative going.

The output of amplifier 11 is passed through a ring circuit 15 comprising resistance 16, capacitor 17, and variable inductance 18. Ring circuit 15 is connected to a voltage source. Resistance 16 is the load resistance of amplifier 11. Ring circuit 15 will cause the production of oscillatory transients in reaction to the input pulse, and after the signal is passed through a D.C. blocking capacitor 21 the waveform is shown at B as in FIG. 2. The first positive going recovery transient shown in FIG. 2 is the one desired for the output. It is passed into a non-inverting amplifier 22, which is provided with appropriate biasing resistors 23, 24, 25 and 26. The output of this amplifier is passed through a second D.C. blocking capacitor 27. A clamp means 31 is provided to remove the negative going portions of the signal through capacitor 27. These will include the original inverted pulse and the first negative going recovery transient shown in B of FIG. 2. Clamp means 31 includes a diode 32 connected to an RC circuit composed of resistance 33 and capacitor 34. Between the diode 32 and the RC circuit there is a voltage source 38 which controls the level of the clamp 31. All negative pulses and all positive pulses less than source 38 will be cut off by the clamp 31. The level of the clamp will be set so that all positive going pulses after the first recovery transient are absorbed.

The output signal will appear across a resistance 35 and is passed through a D.C. blocking capacitor 36 to a gain control 37. Gain control 37 is variable to adjust the level of the output pulse to the desired level. The form of the output pulse is shown at waveform C in FIG. 2. The design of the ring circuit 15 is critical in the operation of the invention. It may be shown that the resistance 16 must be greater than $$\sqrt{L4/C}$$

where L is the inductance of inductance 18 at the lowest frequency designed to be passed through the circuit and C is capacitance 17. This is necessary in order to have transients resulting from the ring circuit 15. If resistance 16 is greater than this value but close to it, transients coming after the initial pulse will be very quickly damped as desired. If the resistance is too much higher than this value the transients after the first recovery transient occurring at $3P/2$, $5P/2$, etc., as shown in FIG. 2, will be significant. It is the procedure to establish the value of resistance 16 at a value which will give a substantial transient for the first recovery transient but to allow all others to be damped to substantially zero. The resonant frequency of ring circuit 15 is determined by the formula $$f=\frac{\sqrt{1/LC-1/4R^2C^2}}{2\pi}$$

It will be seen that if $R^2$ is too close to $L/4C$, $f$ will be very low indeed. Moreover, the transients including the first transient, which is the one desired, will be damped too quickly. The procedure is to establish resistance 16 at a value somewhat above the value of $$\sqrt{L/4C}$$

sufficient to give a substantial value for the first transient at $P/2$, as shown in FIG. 2, but sufficiently close to damp out all subsequent transients at, for example, $3P/2$, $5P/2$, etc. P is equal to $1/f$.

It will be seen when the waveform shown at B is amplified by amplifier 22 and passed to clamp 31 all of the negative portions of the waveform including the original inverted pulse and the first inverted transient, will be absorbed through diode 32, capacitance 34, and resistance 33. Only the first recovery transient of waveform B will be passed to the gain control 37. Gain control 37 will then adjust the height of the pulse shown at level C as desired.

It will be seen from FIG. 2 that the period of the delay is determined by the resonant frequency of ring circuit 15. The beginning of the first recovery transient, as shown in FIG. 2, is seen to be $P/2$ time later than the beginning of the original input pulse where, as before, P equals $1/f$ and $f$ is the damped frequency of ring circuit 15. For the use in which this delay line may be put in a sonar circuit, the input pulse itself would be approximately of the same frequency as that of the ring circuit.

It will be apparent that the delay line may equally be used with negative going pulses. In that case, the polarities of all of the voltage sources, as well as the polarity of the amplifiers and the clamp circuit, will be reversed. In all other respects, the operation of the delay line will be the same.

A variation on the circuit of FIG. 1 would be to put the input pulse into the ring circuit 15 uninverted and to invert it in the output amplifier 22. In either event the result is the same, that the clamp circuit will eliminate the unwanted negative going portions constituting the original pulse and the first negative going transient and leaving the positive going first recovery transient as the output.

It will be understood that various changes in the details and arrangement of parts, which have been herein described and illustrated in order to explain the nature of the invention, may be made by those skilled in the art within the principle and scope of the invention as expressed in the appended claims.

What is claimed is:

1. An electrical pulse delay line comprising:

heavily damped ring circuit means including a first resistor, a first capacitor of value C, and an inductor of value L, connected in parallel in a network, said network being adapted for producing oscillatory recovery transients in response to receiving a signal pulse having a first polarity, said resistor having a value R which is greater than $$\sqrt{L/4C}$$

and which is sufficient to produce a substantial first recovery transient having a second polarity opposite to said first polarity and sufficiently close to said value to cause subsequent transients of said second polarity to be substantially damped out;

a diode having one terminal connected to said ring circuit means for receiving said oscillatory recovery transients;

a parallel circuit including a second resistor and a second capacitor, said circuit being connected between ground and the other terminal of said diode;

voltage means connected to said other terminal of said diode for providing thereto a diode bias voltage having a predetermined level of a single polarity;

a third resistor connected between ground and said one terminal of said diode;

said diode being so poled and said predetermined level being sufficient to cause said diode to remove all transients of said first polarity and transients of said second polarity having a level less than said predetermined level.

2. An electrical pulse delay line as recited in claim 1 wherein said ring circuit means further includes:

non-inverting amplifier means connected between said network issuing said recovery transients and said diode.

3. An electrical pulse delay line as recited in claim 1 wherein:

said inductor in said ring circuit means is a variable inductor, said first resistor having said value R predetermined in accordance with a maximum value L of said variable inductor wherein said ring circuit means has a lowest predetermined resonant frequency.

References Cited

UNITED STATES PATENTS 3,226,567 12/1965 Bradmiller et al. ---- 328—223

ARTHUR GAUSS, *Primary Examiner.*

R. H. EPSTEIN, J. D. FREW, *Assistant Examiners.*